United States Patent
Zhang et al.

(10) Patent No.: US 9,990,175 B2
(45) Date of Patent: Jun. 5, 2018

(54) LIGHTING DEVICE AND VOICE BROADCASTING SYSTEM AND METHOD THEREOF

(71) Applicant: ZHEJIANG SHENGHUI LIGHTING CO., LTD., Jiaxing (CN)

(72) Inventors: Zonggen Zhang, Jiaxing (CN); Shuyu Cao, Jiaxing (CN); Zhen Xie, Jiaxing (CN); Weisheng Zhou, Jiaxing (CN); Jinxiang Shen, Jiaxing (CN)

(73) Assignee: ZHEJIANG SHENGHUI LIGHTING CO., LTD, Jiaxing (CN)

( * ) Notice: Subject to any disclaimer, the term of this patent is extended or adjusted under 35 U.S.C. 154(b) by 90 days.

(21) Appl. No.: 14/902,020

(22) PCT Filed: Apr. 28, 2015

(86) PCT No.: PCT/CN2015/077688
§ 371 (c)(1),
(2) Date: Dec. 30, 2015

(87) PCT Pub. No.: WO2016/026324
PCT Pub. Date: Feb. 25, 2016

(65) Prior Publication Data
US 2016/0224315 A1 Aug. 4, 2016

(30) Foreign Application Priority Data
Aug. 21, 2014 (CN) .......................... 2014 1 0415761

(51) Int. Cl.
| | |
|---|---|
| *G06F 3/16* | (2006.01) |
| *G10L 15/26* | (2006.01) |
| *H05B 37/02* | (2006.01) |
| *F21V 33/00* | (2006.01) |
| *G10L 15/22* | (2006.01) |

(52) U.S. Cl.
CPC .......... *G06F 3/167* (2013.01); *F21V 33/0056* (2013.01); *G10L 15/22* (2013.01);
(Continued)

(58) Field of Classification Search
CPC ..... G06F 13/24; G06F 9/3861; G10L 15/265; H04M 1/271; H04M 19/04; H04N 5/63
See application file for complete search history.

(56) References Cited

U.S. PATENT DOCUMENTS

| | | | | |
|---|---|---|---|---|
| 5,946,050 A | * | 8/1999 | Wolff ...................... | G10L 15/04 348/462 |
| 6,338,150 B1 | * | 1/2002 | Johnson .................... | G06F 1/26 714/39 |

(Continued)

FOREIGN PATENT DOCUMENTS

| | | | | |
|---|---|---|---|---|
| CN | 102128382 | A | * | 7/2011 |
| CN | 201902982 | U | * | 7/2011 |

(Continued)

OTHER PUBLICATIONS

The World Intellectual Property Organization (WIPO) International Search Report for PCT/CN2015/077688 dated Jul. 31, 2015.

*Primary Examiner* — Anne L Thomas-Homescu
(74) *Attorney, Agent, or Firm* — Anova Law Group, PLLC (57) ABSTRACT

The present disclosure provides a lighting device and related voice broadcasting systems and methods. The lighting device includes a light-emitting module configured to provide lighting, a process and control module, a memory module configured to store audio contents stored in a local memory and downloaded from the Internet, and a voice input module configured to receive voice information from users. The process and control module is configured to receive voice information from the voice input module, to recognize and determine whether the voice information is a voice command, and to send control instructions to a corresponding module according to the matched voice command. A voice output module is configured to select and play a audio content according to the control instructions sent from the process and control module.

21 Claims, 4 Drawing Sheets

Wireless Router

Smart Mobile Terminal (52) U.S. Cl.
CPC .............. *G10L 15/26* (2013.01); *H05B 37/02* (2013.01); *H05B 37/0236* (2013.01); *H05B 37/0245* (2013.01); *G10L 2015/223* (2013.01); *Y02B 20/48* (2013.01)

(56) References Cited

U.S. PATENT DOCUMENTS

| | | | | |
|---|---|---|---|---|
| 6,544,096 | B1* | 4/2003 | Pyrce | A63H 33/00 206/541 |
| 6,868,385 | B1* | 3/2005 | Gerson | G10L 15/30 370/468 |
| 6,963,759 | B1* | 11/2005 | Gerson | 455/414.1 |
| 7,418,392 | B1* | 8/2008 | Mozer | G10L 13/00 315/307 |
| 9,561,449 | B2* | 2/2017 | Wang | H04R 27/00 |
| 2004/0024938 | A1* | 2/2004 | Bian | G06F 9/4812 710/260 |
| 2004/0107373 | A1* | 6/2004 | Ferrara | G06F 1/30 713/300 |
| 2005/0021343 | A1* | 1/2005 | Spencer | G10L 15/26 704/275 |
| 2005/0119996 | A1* | 6/2005 | Ohata | G06F 11/3495 |
| 2006/0211455 | A1* | 9/2006 | Choi | H04L 29/06027 455/567 |
| 2006/0282702 | A1* | 12/2006 | Bando | G06F 9/30181 714/11 |
| 2007/0041552 | A1* | 2/2007 | Moscato | H04M 1/6075 379/214.01 |
| 2007/0079111 | A1* | 4/2007 | Chen | G06F 9/441 713/1 |
| 2007/0230281 | A1* | 10/2007 | You | G04G 13/021 368/10 |
| 2007/0260777 | A1* | 11/2007 | Timpe | G06F 13/4059 710/52 |
| 2008/0175427 | A1* | 7/2008 | Chen | H04R 1/025 381/387 |
| 2008/0188870 | A1* | 8/2008 | Andre | A61B 34/35 606/130 |
| 2009/0228696 | A1* | 9/2009 | McKelvey | G06F 11/1417 713/2 |
| 2009/0281897 | A1* | 11/2009 | Antos | G06F 17/30746 705/14.45 |
| 2010/0178030 | A1* | 7/2010 | Colby | H04N 5/782 386/291 |
| 2010/0191822 | A1* | 7/2010 | Archer | H04L 12/4641 709/213 |
| 2010/0241831 | A1* | 9/2010 | Mahadevan | G06F 9/4812 712/42 |
| 2011/0004670 | A1* | 1/2011 | Mishra | H04L 67/16 709/217 |
| 2011/0191488 | A1* | 8/2011 | Wong | G06F 15/16 709/231 |
| 2011/0254723 | A1* | 10/2011 | Tsurumoto | G08C 17/00 341/176 |
| 2011/0280008 | A1* | 11/2011 | Bakian | F21S 6/001 362/161 |
| 2011/0287806 | A1* | 11/2011 | Vasudevan | H04M 1/72558 455/556.1 |
| 2012/0026726 | A1* | 2/2012 | Recker | F21K 9/13 362/157 |
| 2012/0059493 | A1* | 3/2012 | Ye | G11B 27/105 700/94 |
| 2012/0099024 | A1* | 4/2012 | Ryu | G06F 8/67 348/730 |
| 2013/0063042 | A1* | 3/2013 | Bora | H05B 33/0863 315/292 |
| 2013/0072764 | A1* | 3/2013 | Shtalryd | A61B 5/08 600/301 |
| 2013/0322264 | A1* | 12/2013 | Campbell | G06F 13/24 370/245 |
| 2013/0330088 | A1* | 12/2013 | Oshima | H04B 10/11 398/130 |
| 2014/0046464 | A1* | 2/2014 | Reimann | H04R 27/00 700/94 |
| 2014/0104033 | A1* | 4/2014 | Griffiths | G05B 19/0426 340/4.3 |
| 2014/0142953 | A1* | 5/2014 | Kim | G10L 15/22 704/275 |
| 2014/0172309 | A1* | 6/2014 | Guthrie | G06F 15/00 702/19 |
| 2014/0181656 | A1* | 6/2014 | Kumar | H04L 12/6418 715/716 |
| 2014/0238221 | A1* | 8/2014 | Roberts | G10H 1/0553 84/724 |
| 2014/0280709 | A1* | 9/2014 | Li | G06F 13/385 709/217 |
| 2014/0316192 | A1* | 10/2014 | de Zambotti | A61M 21/02 600/28 |
| 2014/0334628 | A1* | 11/2014 | Lee | H04R 1/00 381/59 |
| 2014/0334653 | A1* | 11/2014 | Luna | G05B 15/02 381/332 |
| 2015/0022469 | A1* | 1/2015 | Mhun | G06F 3/0416 345/173 |
| 2015/0036863 | A1* | 2/2015 | Wen | H04R 1/028 |
| 2015/0081291 | A1* | 3/2015 | Jeon | G06F 3/167 704/235 |
| 2015/0084518 | A1* | 3/2015 | Takahashi | H05B 37/0236 315/152 |
| 2015/0131816 | A1* | 5/2015 | Inagaki | H04M 1/0266 381/151 |
| 2015/0186105 | A1* | 7/2015 | Wellman | G06F 17/3074 700/94 |
| 2015/0208489 | A1* | 7/2015 | Dijk | H05B 37/0245 315/294 |
| 2015/0282282 | A1* | 10/2015 | Breuer | H05B 37/0272 |
| 2015/0293655 | A1* | 10/2015 | Tan | G06F 3/0486 715/727 |
| 2015/0381706 | A1* | 12/2015 | Wohlert | H04L 67/10 |
| 2016/0044148 | A1* | 2/2016 | Pizzo | H04M 1/026 |
| 2016/0057521 | A1* | 2/2016 | Sun | H04R 1/028 381/334 |
| 2016/0066391 | A1* | 3/2016 | Delnoij | H05B 37/0218 315/130 |
| 2016/0128167 | A1* | 5/2016 | Sun | H05B 37/0236 |
| 2016/0188344 | A1* | 6/2016 | Tamir | G06F 9/3867 712/244 |
| 2016/0205362 | A1* | 7/2016 | Tang | H05B 33/0845 348/744 |
| 2016/0212376 | A1* | 7/2016 | Tang | F21V 33/0052 |
| 2016/0286633 | A1* | 9/2016 | Juslen | H05B 33/0815 |
| 2016/0330825 | A1* | 11/2016 | Recker | H05B 37/0272 |
| 2017/0079119 | A1* | 3/2017 | Horist | H05B 37/0236 |
| 2017/0093210 | A1* | 3/2017 | Recker | H02J 9/061 |
| 2017/0108236 | A1* | 4/2017 | Guan | F24F 11/0012 |
| 2017/0108878 | A1* | 4/2017 | Krispin | G05D 1/12 |
| 2017/0117891 | A1* | 4/2017 | Lohbihler | G08C 17/02 |
| 2017/0118143 | A1* | 4/2017 | Tamir | H04L 49/901 |
| 2017/0120145 | A1* | 5/2017 | Zeng | A63F 13/28 |
| 2017/0189640 | A1* | 7/2017 | Sadwick | A61M 21/02 |
| 2017/0214777 | A1* | 7/2017 | Jannard | H04M 1/0279 |
| 2017/0231058 | A1* | 8/2017 | Sadwick | H05B 33/0896 |

FOREIGN PATENT DOCUMENTS

| | | | | |
|---|---|---|---|---|
| CN | 202660296 | U | * 1/2013 | |
| CN | 202868405 | | 4/2013 | |
| CN | 202868405 | U | * 4/2013 | |
| CN | 203338951 | U | * 12/2013 | |
| CN | 103501558 | | 1/2014 | |
| CN | 103501558 | A | * 1/2014 | .............. H04R 27/00 |
| CN | 103929687 | A | * 7/2014 | .............. H04R 1/028 |
| CN | 104197299 | A | * 12/2014 | .............. G10L 15/26 |
| CN | 204114885 | U | * 1/2015 | |
| CN | 105276498 | A | * 1/2016 | |
| KR | 20150027661 | A | * 3/2015 | |

* cited by examiner

LIGHTING DEVICE AND VOICE BROADCASTING SYSTEM AND METHOD THEREOF

CROSS-REFERENCES TO RELATED APPLICATIONS

This application is a national phase entry under 35 USC § 371(c) of PCT Application No. PCT/CN2015/077688, filed on Apr. 28, 2015, which claims the priority of Chinese Patent Application No. 201410415761.3, filed on Aug. 21, 2014, the entire content of all of which are incorporated herein by reference.

FIELD OF THE DISCLOSURE

The present disclosure relates to the field of lighting technologies and, more particularly, relates to lighting devices, and voice broadcasting systems and methods including a lighting device.

BACKGROUND

Lighting devices often use various light sources to provide comfortable and pleasant environment with good visibility for work, living, and/or specific purposes. Nowadays, lighting devices have become more and more intelligent. In a smart home, lighting devices are connected to a home network by network technology, enabling lighting control through the network. Therefore, lighting devices may also be smart devices used in a smart home environment to bring unique smart home experience to users and to create a comfortable living environment.

Along with the development of smart technologies, it is desirable to integrate possible resources, to enhance functional applications of lighting devices, and to simplify and integrate smart devices for smart homes.

A story-telling machine is a digital product used to facilitate early childhood education and to improve early childhood emotion quotient (EQ) education. The story-telling machine, as a popular educational toy for children, is a combination of an early-generation-repeater and an mp3 player. The story-telling machine often uses cartoon images as exterior appearance. A circuit board of the story-telling machine may provide operation buttons and voice circuit controlled by a microprocessor. The story-telling machine can be used to broadcast stories and help children to learn. The story-telling machine is popularly used in many homes.

However, the story-telling machines generally have a limited number of stories stored therein, with limited content and few options. There may be other limitations. The story-telling machine often cannot update stories according to child's interest or parents' guidance. Meanwhile, the story-telling machine is also used as a toy for children, and often falls accidentally or is dropped on the ground. Therefore, it is difficult for the story-telling machine to be continuously used and it is easy to lose the story-telling machine. Further, with an increasing number of toys manufactured for the children, a large number of toys, if not being used effectively, may be piled up at home and wasted.

Therefore, there is a need to further integrate smart home resources, to fully exploit smart applications of lighting devices, and to provide intelligent, convenient and content-rich voice broadcasting solutions, and to bring new smart home experiences to users.

The disclosed method and system are directed to solve one or more problems set forth above and other problems in the art.

BRIEF SUMMARY OF THE DISCLOSURE

The present disclosure overcomes the technical problems set forth above and provides a lighting device and related voice broadcasting system and method. The disclosed device, system, and method may be easy to operate, allow content selection, have rich resources, save home space, and bring smart life experiences to users.

One aspect of the present disclosure provides a lighting device. The lighting device includes a light-emitting module configured to provide lighting; a power supply module configured to drive the light-emitting module and to provide power to the entire lighting device; a wireless module configured to establish wireless connection to the Internet; a voice input module configured to receive voice information from users; and a memory module configured to store audio contents preset in a local memory and downloaded from the Internet. The process and control module is configured to receive the voice information from the voice input module, to recognize and determine whether the voice information is a voice command, and after matching with the voice command, to send control instructions to a corresponding module according to the voice command. The process and control module is respectively connected to each of the light-emitting module, the power supply module, the wireless module, the voice input module, the memory module and the voice output module. A voice output module is configured to select and play an audio content according to the control instructions sent from the process and control module.

Another aspect of the present disclosure provides a voice broadcasting system, including a lighting device and a smart mobile terminal configured to control the lighting device and change parameters of the lighting device. The lighting device may wirelessly connect to the Internet and the smart mobile terminal, through a wireless module of the lighting device. The lighting device includes a light-emitting module configured to provide lighting, a power supply module configured to drive the light-emitting module and to provide power to the entire lighting device, a voice input module configured to receive voice information from a user, a memory module configured to store audio contents preset in a local memory and downloaded from the Internet, a process and control module configured to receive the voice information from the voice input module, to recognize and determine whether the voice information is a voice command, and after matching with the voice command, to send the control instructions to a corresponding module according to the voice command; and a voice output module configured to select and play a audio content according to control instructions sent from the process and control module.

Another aspect of the present disclosure provides a voice broadcast method. In the method, a lighting device is provided and turned on to automatically perform parameter initialization of the lighting device. Network connections are established by connecting a wireless module of the lighting device to the Internet. A network command interrupt is enabled. The method further includes: enabling a voice command recognition interrupt, inquiring whether a voice input module of the lighting device receives voice information from a user, and performing voice recognition, by the process and control module, on the received voice information, and sending the control instructions to a corresponding module of the lighting device. According to the control instructions, audio content in the local memory or from the Internet is selected and broadcast by the voice output module.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to drawings. Wherever possible, the same reference numbers will be used throughout the drawings to refer to the same or like parts. It is apparent that the described embodiments are some but not all of the embodiments of the present invention. Based on the disclosed embodiment, persons of ordinary skill in the art may derive other embodiments consistent with the present disclosure, all of which are within the scope of the present invention.

Figure 1:
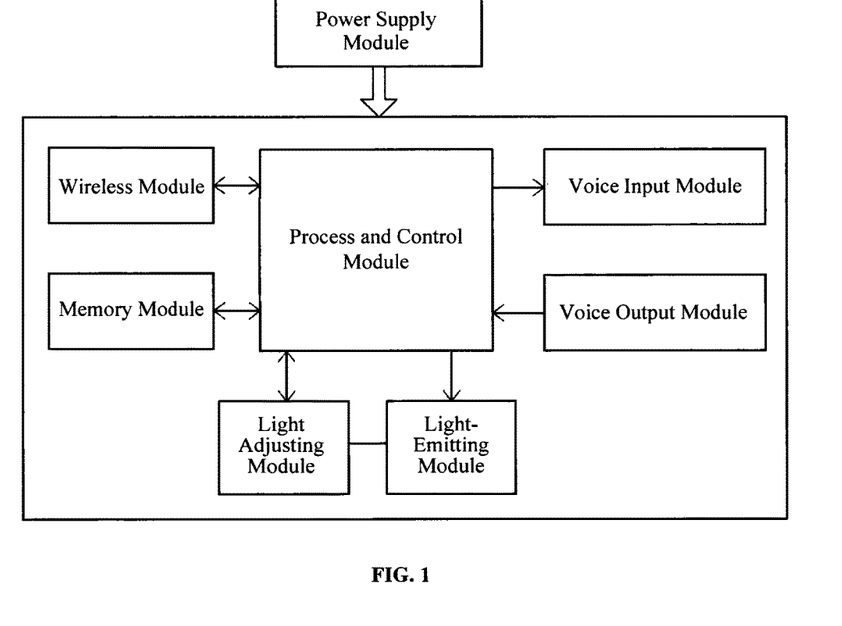
FIG. 1 is a structure diagram illustrating an exemplary lighting device consistent with the present disclosure.

FIG. 1 is a structure diagram illustrating an exemplary lighting device consistent with the present disclosure. As shown in FIG. 1, the lighting device may include a light-emitting module, a power supply module, a process and control module, a memory module, a voice input module, a voice output module, and/or a wireless module.

The power supply module is configured to drive the light-emitting module and to provide power to the entire lighting device. The wireless module is configured to wirelessly connect the lighting device with the Internet. The wireless module may adopt 2.4G or 5G WI-FI technology, or adopt 2.5G, 3G or 4G mobile wireless communication technology.

The voice input module is configured to collect voice information from users. In certain embodiments, the voice input module may be a microphone. The process and control module may be configured to receive the voice information from the voice input module, to recognize and determine whether the voice information is a voice command, and after the voice command is matched, to send corresponding control instructions to other modules according to the voice command.

The memory module may be configured to store preset voice contents, e.g., in a local memory, and audio contents downloaded from the Internet. The audio contents may include songs, stories, poems, articles, language (e.g., English, Chinese, French, etc.) education materials, weather forecast, news, and/or any information that can be stored in audio format. Alternatively, the audio contents may be previously-prepared recordings. The voice output module may be configured to play selected audio content according to the control instructions from the process and control module. In certain embodiments, the voice output module may be a speaker with an amplifier.

For example, the lighting device may further include a light adjusting module. The light adjusting module may be configured between the process and control module and the light-emitting module, to adjust brightness, color, and/or color temperature of light emitted from the light-emitting module.

In one embodiment, while broadcasting the audio contents, the lighting device may be controlled to gradually dim or gradually change color and/or color temperature of the emitted light at certain time points or after a certain period of time according to listener's or user's needs (e.g., dimming the light for the bedtime) or according to background information associated with the stories being told.

In one example, when a sunny environment is mentioned in a story, the emitted light from the lighting device can change color to be brighter. In another example, a lighting device may provide about 800 lumens of light output at full brightness, and when used for telling a bedtime story, the light adjusting module of the lighting device may be configured to decrease the light output for about 200 lumens at every 10 minutes to gradually dim the light. In addition, a user may set the lighting device to turn off completely after 40 minutes of listening.

In certain embodiments, the lighting device may be an LED (i.e., light emitting diode) lighting device, such as an LED lamp. The LED lamp may be placed at any locations in a home environment, for example, in a bedroom, a playing room, and/or a living room. LED is a solid-state semiconductor device that can directly convert electrical energy to visible light. LED technologies provide many advantages including energy conservation, environmental protection, controllable lighting, strong practicability, high stability, short response time, long operational lifetime, etc. To promote low carbon life style and protect environment, LED technologies have been widely adopted in various lighting applications.

Figure 2:
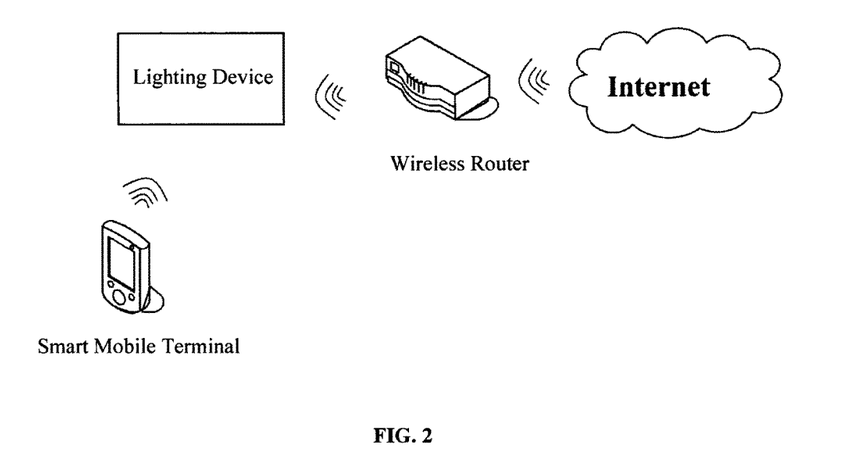
FIG. 2 is a structure diagram illustrating an exemplary voice broadcasting system using a lighting device consistent with the present disclosure.

FIG. 2 is a structure diagram illustrating an exemplary voice broadcasting system using a lighting device consistent with the present disclosure. As shown in FIG. 2, the voice broadcasting system may include the disclosed lighting device and a smart mobile terminal.

The lighting device may wirelessly connect to the Internet and the smart mobile terminal, respectively. The lighting device may also wirelessly connect to the Internet through a wireless router. Specifically, the wireless module of the lighting device may wirelessly connect to the wireless router. The smart mobile terminal may be configured to change parameters and configurations of the lighting device. For example, the smart mobile terminal may be any terminal having a smart operating system, such as a smart phone, a tablet computer, or a laptop computer.

In various embodiments, the voice commands may include "start playing", "play the previous story", "play the next story", "play via network", "play locally", "play along a single loop of contents", "play by circulating all contents", "stop playing," etc.

The disclosed system may be configured with initialization parameters, such as whether to start the broadcasting, a default broadcasting path using a local memory, and a default broadcasting mode by circularly broadcasting all audio contents. The smart mobile terminal may modify system parameters including, e.g., values of initialization parameters, through a control interface of the lighting device on the smart mobile terminal, e.g., by an application installed in the smart mobile terminal.

Figure 3:
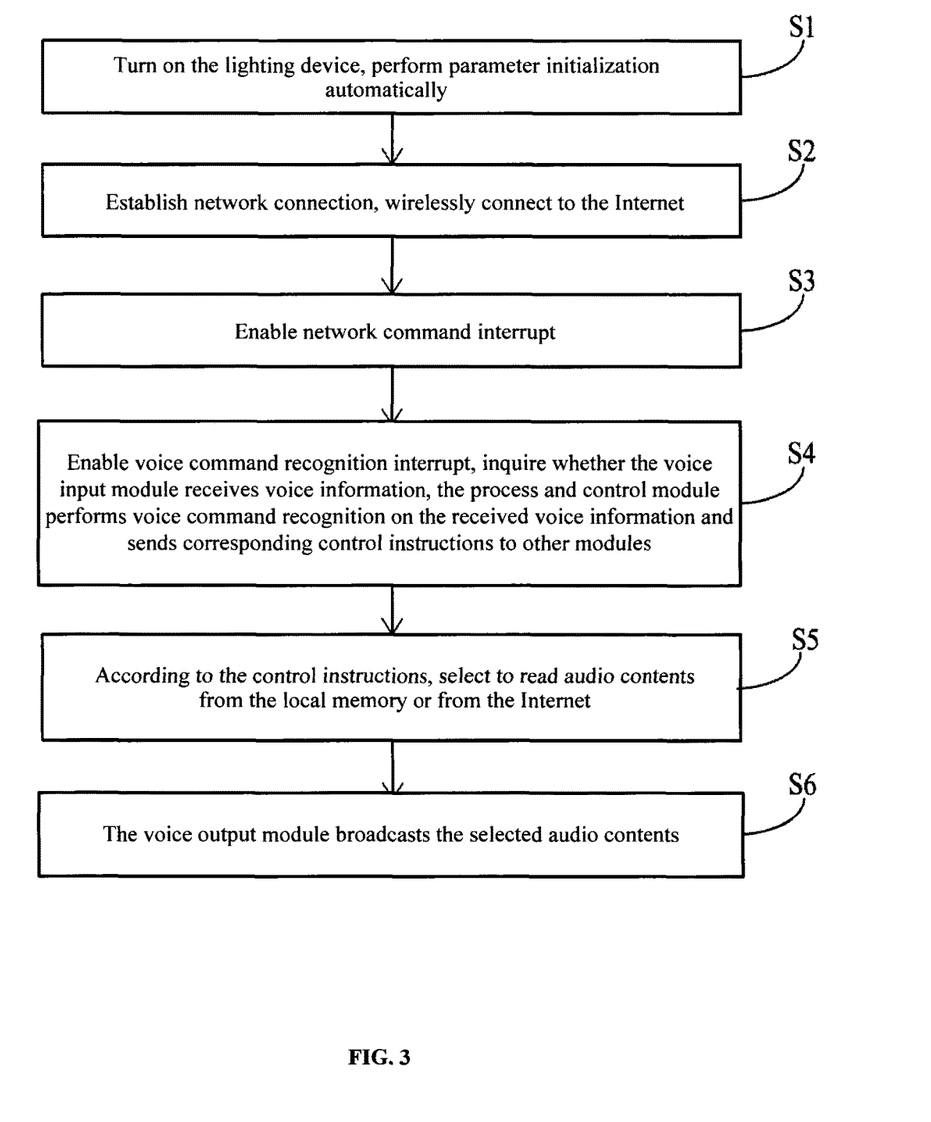
FIG. 3 is a flow chart illustrating an exemplary voice broadcasting method using a lighting device consistent with the present disclosure.

FIG. 3 is a flow chart illustrating an exemplary voice broadcasting method using a lighting device consistent with the present disclosure. As shown in FIG. 3, the voice broadcasting method may include the following exemplary steps.

Step S1 includes turning on the lighting device, and performing parameter initialization automatically. Step S2 includes establishing network connections, and wirelessly connecting the lighting device to the Internet. Step S3 includes enabling a network command interrupt.

Step S4 includes enabling a voice command recognition interrupt, inquiring whether the voice input module receives voice information. The process and control module performs voice recognition on the received voice information and sends control instruction to other, corresponding modules. Step S5 includes selecting to read local audio contents from the local memory or to read audio contents from the Internet, according to the control instructions. Step S6 includes the voice output module broadcasting the selected audio contents.

In addition, Step S4 may further include the following steps. Step 41 may include detecting whether there is inputted voice. If there is inputted voice, the voice command recognition interrupt may be triggered. Step 42 may include performing voice recognition on the inputted voice to provide recognized voice. Step 43 may include determining whether the recognized voice is a voice command. When the recognized voice is determined to be a voice command, after matching with a voice command, parameters of the lighting device can be modified correspondingly. The process and control module of the lighting device may control other modules of the lighting device according to the modified parameters.

In Step S5, when the audio contents from the Internet are read, the system may visit the preset website links and download the audio contents to the local memory.

For example, before performing Step S5, the method may further include a step of enabling an alarm interrupt. This step may include determining whether a current time is consistent with (e.g., the same as) a preset alarm time. If the current time is consistent with the preset alarm time, an alarm sound is played. When the current time is not consistent with the preset alarm time, the alarm interrupt is not triggered.

When the alarm interrupt is triggered, the system may automatically play the audio contents stored locally. Understandably, multiple alarm times may be set. The alarm reminder may be realized by playing alarm sound and/or by changing lighting brightness and/or color. When playing the alarm sound, a voice command, such as "turn off the alarm," may stop the alarm sound. When broadcasting audio contents at a preset alarm time, a user may use voice commands to control the voice broadcasting.

In various embodiments, the network command interrupt, the voice command recognition interrupt, and/or the alarm interrupt may only be triggered after the lighting device is switched on. The triggering requirement of the network command interrupt may include triggering the network command interrupt, after receiving a signal or instruction for modifying parameters from the smart mobile terminal. The parameters of the lighting device can be modified according to the signal or the instruction.

The voice command recognition interrupt may have a triggering requirement such as triggering the voice command recognition interrupt when a voice input is detected. The alarm interrupt may have a triggering requirement such as triggering the alarm interrupt when the current time is consistent with or the same as the preset alarm time.

In one example, the above interrupts may be triggered at any time during the voice broadcasting process. When such an interrupt is handled correspondingly, the process would return to the corresponding interruption point after the interrupt/pause.

In certain embodiments, when the voice broadcasting system starts broadcasting, the smart mobile terminal may use an APP (Application) installed therein to control the lighting device and to select audio contents, such as songs and news, to broadcast or to play. Voice commands may be used to control the broadcasting process using, for example, "start playing", "play the previous story", "play the next story", "play via network", "play locally", "play along a single loop of contents", "play by circulating all contents", and "end the playing". The voice commands may be modified to be a voice command including specific broadcasting contents. For example, the voice command "start playing" may be modified to "start playing news", "start playing songs", etc.

In certain embodiments, the audio contents may be stories. An LED lamp may be used for playing/telling these stories.

Specifically, the voice commands for story-telling may be configured as: "start telling stories", "tell the previous story", "tell the next story", "tell stories via network", "tell stories locally", "tell story along a single loop", "tell story by circulating all stories", and/or "end telling stories". Understandably, voice commands with other functions may be provided. These voice commands may be modified by the smart mobile terminal, or may include default factory-set commands. Other suitable voice forms can also be configured for the voice commands.

Figure 4:
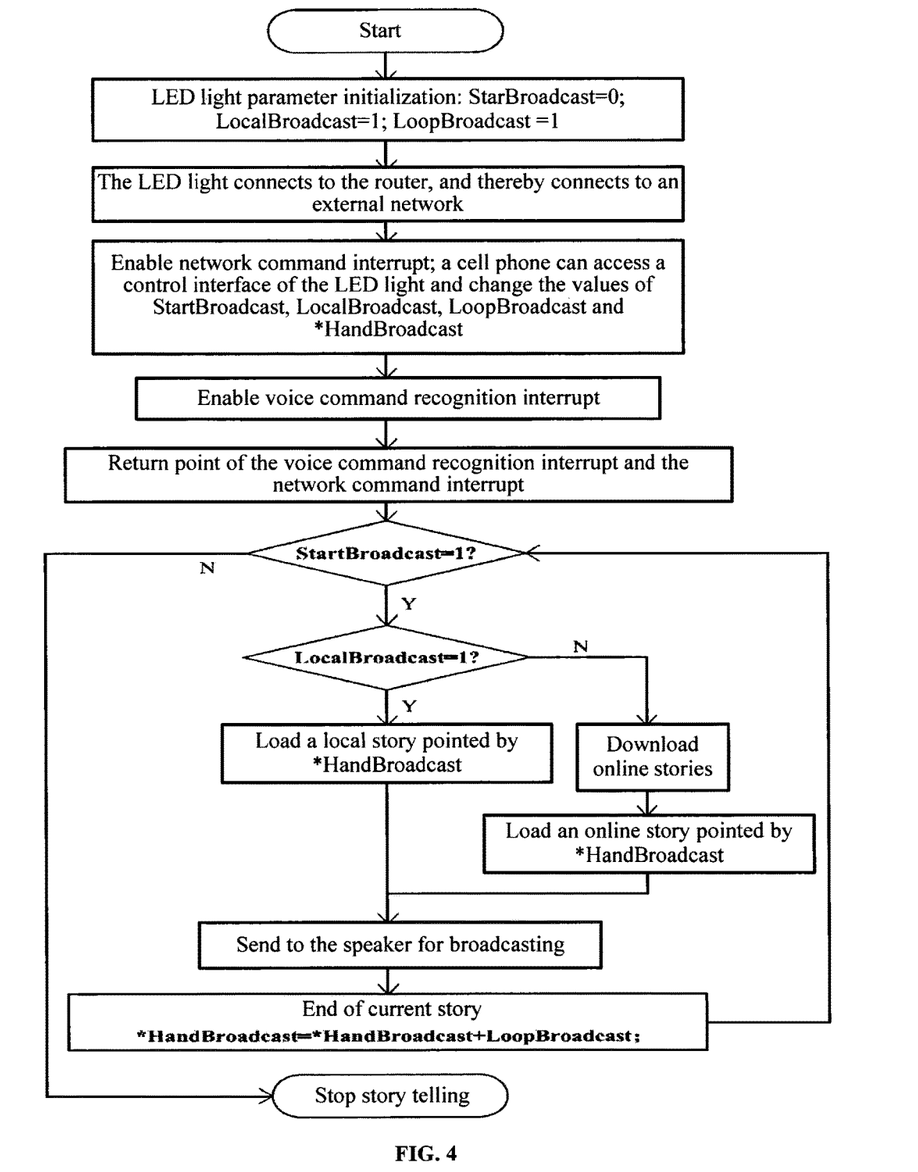
FIG. 4 is a flow chart illustrating another exemplary voice broadcasting method using an LED lighting device consistent with the present disclosure.

As shown in FIG. 4, when starting the voice broadcasting system, parameters may be initialized as StartBroadcast=0, LocalBroadcast=1, and LoopBroadcast=1. Parameter "StartBroadcast" indicates whether to start telling stories. When StartBroadcast is 1, the voice output module broadcasts selected story content; and when StartBroadcast is 0, the voice output module does not broadcast.

Parameter "LocalBroadcast" indicates a source path of stories. When LocalBroadcast is 1, stories stored locally, e.g., in a local memory, are read (or loaded); and when LocalBroadcast is 0, stories from the Internet are read (or loaded).

Parameter "LoopBroadcast" refers to a broadcasting mode. When LoopBroadcast is 1, stories are circularly told; and when LoopBroadcast is 0, stories are told along a set sequence. For example, the initialization parameters are configured not to start broadcasting, to tell stories from local memory first, and to have a broadcasting mode to circularly tell all stories.

After initialization, the LED lamp may be connected to a wireless router, and thereby connected to an external network, which generally refers to the Internet. A network command interrupt is enabled. The smart mobile terminal such as a cell phone may be used to visit a control interface of the LED lamp on the cell phone to modify parameter values such as StartBroadcast, LocalBroadcast, and LoopBroadcast.

Figure 5:
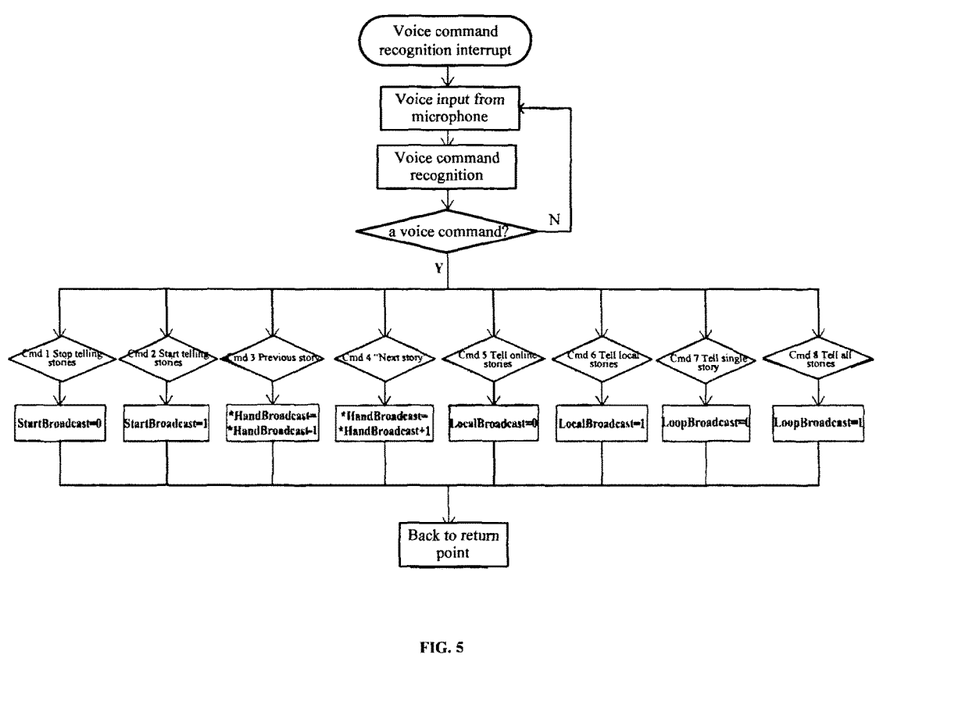
FIG. 5 is a flow chart illustrating an exemplary voice recognition command interruption consistent with the present disclosure.

Further, a voice command recognition interrupt may be enabled. As shown in FIG. 5, after receiving an inputted voice from the microphone, the voice command recognition interrupt may be triggered. The process and control module may perform voice recognition on the inputted voice information. If the voice information is a voice command, corresponding parameters can be modified according to a matched voice command as follows:

If the recognized voice command is voice command 1 "stop telling stories", then StartBroadcast=0;

If the recognized voice command is voice command 2 "start telling stories", then StartBroadcast=1;

If the recognized voice command is voice command 3 "tell the previous story", then *HandStory=*HandStory−1;

If the recognized voice command is voice command 4 "tell the next story", then *HandStory=*HandStory+1;

If the recognized voice command is voice command 5 "tell stories via network", then LocalBroadcast=0;

If the recognized voice command is voice command 6 "tell stories locally", then LocalBroadcast=1;

If the recognized voice command is voice command 7 "tell stories along a single loop", then LoopBroadcast=0; and If the recognized voice command is voice command 8 "tell stories by circulating all stories", then LoopBroadcast=1.

Specifically, *HandStory is a pointer pointing to a story in the local memory or an online link. By default, the pointer points to a current story. When *HandStory−1, the pointer points to a previous story; and when *HandStory+1, the pointer points to a next story.

Returning to FIG. 4, the process and control module of the lighting device may control various modules of the lighting device according to the modified parameters. First, the value of StartBroadcast is determined. If StartBroadcast is 1, the speaker stops broadcasting stories. If StartBroadcast is not 1, then the value of LocalBroadcast is determined.

If LocalBroadcast is 1, then the local story referenced by *HandStory is retrieved and sent to the speaker for broadcasting. If LocalBroadcast is not 1, stories are downloaded from the Internet. When reading stories from the Internet, a preset website link is visited. The stories are downloaded to the local device and then being read.

The online story referenced by *HandStory is retrieved and sent to the speaker for broadcasting. When the current story is finished, set *HandStory to *HandStory+LoopBroadcast. That is, if LoopBroadcast is 1, then *HandStory points to the next story, enabling circular broadcasting; and if LoopBroadcast is 0, the value of *HandStory does not change, so the broadcasting mode includes a circular broadcasting of the current single story. When the value of StartBroadcast is detected not to be 1, the story broadcasting ends.

As such, the present disclosure uses voice recognition to control the lighting device to broadcast various contents. The disclosed devices, methods, and systems are easy to operate with rich contents and increased intelligence and bring users remarkable smart home experiences.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

INDUSTRIAL APPLICABILITY AND ADVANTAGEOUS EFFECTS

Without limiting the scope of any claim and/or the specification, examples of industrial applicability and certain advantageous effects of the disclosed embodiments are listed for illustrative purposes. Various alternations, modifications, or equivalents to the technical solutions of the disclosed embodiments can be obvious to those skilled in the art and can be included in this disclosure.

The present disclosure provides a lighting device, and a voice broadcasting system and method using the lighting device. In the lighting device, a wireless module, a process and control module, a voice output module, a voice input module, and/or a memory module may be integrated within a single LED lamp. By connecting to the Internet via the wireless module, rich audio content resources may be obtained online and downloaded for local broadcasting. The voice input module may collect and obtain voice information. The process and control module may perform voice recognition and matching processes to enable voice-controlled broadcasting.

The disclosed voice broadcast system and method does not affect the appearance and size of the lighting device, such as an integrated LED lighting device, and ensures desired lighting output. Meanwhile, the lighting device can control the broadcasting audio contents after receiving voice commands, saving time and saving home spaces. The present disclosure is easy to operate, has rich contents, increases the intelligence of the lighting devices, and brings users different smart home experiences.

In one embodiment, when the disclosed voice broadcasting systems and methods are used for telling stories, voice-controlled LED lamps can be used to provide suitable lighting and also to tell stories (e.g., for bedtime, for learning, for relaxing, etc.) by sending voice commands to the LED lamps to broadcast stories to children or anyone who wants to listen to a story as desired. For example, while stories are told as bedtime stories, young children may fall asleep pleasantly while the lighting dims gradually in the bedroom.

What is claimed is:

1. A lighting device, comprising:
a light-emitting diode configured to emit light;
a power supply configured to drive the light-emitting diode and to provide power to the lighting device;
a wireless communication circuit configured to establish wireless connections to the Internet;
a microphone configured to receive voice information from a user;
a memory configured to store audio contents;
a processor configured to receive the voice information from the microphone, to recognize and determine whether the voice information is a voice command; and
a speaker configured to select and play an audio content according to the voice command;
wherein the processor is further configured to adjust at least one of a brightness or a color temperature of the light emitted by the light-emitting diode based on information associated with the audio content being played by the speaker,
the processor is respectively connected to the light-emitting diode, the power supply, the wireless communication circuit the microphone, the memory, and the speaker; and
the processor is further configured to, after determining the voice command, send control instructions to at least one of the wireless communication circuit, the memory, the speaker, or the light-emitting diode according to the voice command,
wherein the audio content played by the speaker is a story; and
the processor is further configured to adjust at least one of the brightness or the color temperature of the light emitted by the light-emitting diode based on the information associated with the story.

2. The lighting device according to claim 1, wherein the audio contents include songs, stories, poems, articles, language education materials, weather forecasts, news, and previously-prepared recordings.

3. The lighting device according to claim 1, wherein the wireless communication circuit adopts 2.4G or 5G WI-FI technology, or adopts 2.5G, 3G or 4G mobile wireless communication technology.

4. A voice broadcasting system, comprising:
a lighting device, comprising:
a light-emitting diode configured to emit light;
a power supply configured to drive the light-emitting diode and to provide power to the lighting device;
a wireless communication circuit configured to establish wireless connections to the Internet;
a microphone configured to collect voice information from a user;
a memory configured to store audio contents;
a processor configured to receive the voice information from the microphone, to recognize and determine whether the voice information is a voice command; and
a speaker configured to select and play an audio content according to the voice command;
wherein the processor is further configured to:
adjust at least one of a brightness or a color temperature of the light emitted by the light-emitting diode based on information associated with the audio content being played by the speaker; and
after determining the voice command, send control instructions to at least one of the wireless communication circuit, the memory, the speaker, or the light-emitting diode according to the voice command, and
a smart mobile terminal configured to control the lighting device and to change parameters of the lighting device, wherein the lighting device wirelessly connects to the Internet and the smart mobile terminal through the wireless communication circuit,
wherein the audio content played by the speaker is a story; and
the processor is further configured to adjust at least one of the brightness or the color temperature of the light emitted by the light-emitting diode based on the information associated with the story.

5. The voice broadcasting system according to claim 4, wherein the voice command includes commands to start playing, play along a single loop of contents, or play by circulating all contents.

6. The voice broadcasting system according to claim 4, wherein the lighting device is configured to be initialized by: turning on a broadcasting, using the memory as a default broadcasting path, and having a default broadcasting mode by circularly broadcasting all of the audio contents.

7. The voice broadcasting system according to claim 4, wherein the smart mobile terminal is configured to modify initialization parameters of the lighting device through a control interface of the lighting device on the smart mobile terminal.

8. The voice broadcasting system according to claim 4, wherein the smart mobile terminal is a smart phone, a tablet computer, a smart TV, or a laptop computer.

9. A voice broadcasting method using a lighting device, comprising:
providing a lighting device, comprising:
a light-emitting diode configured to emit light;
a wireless communication circuit configured to establish wireless connections to the Internet;
a microphone configured to collect voice information from a user;
a memory configured to store audio contents;
a processor configured to receive the voice information from the microphone, to recognize and determine whether the voice information is a voice command; and
a speaker configured to select and play an audio content according to the voice command;
turning on the lighting device to perform parameter initialization of the lighting device;
establishing network connections by connecting the wireless communication circuit of the lighting device to the Internet;
enabling a network command interrupt;
enabling a voice command recognition interrupt, inquiring whether the microphone of the lighting device receives the voice information, and performing, by the processor, voice recognition on the received voice information and sending control instructions to at least one of the wireless communication circuit, the memory, the speaker, or the light-emitting diode according to the voice command;
selecting the audio content in the memory according to the control instructions;
broadcasting, by the speaker, the selected audio content; and
adjusting at least one of a brightness or a color temperature of the light emitted by the light-emitting diode based on information associated with the audio content being broadcasted by the speaker,
wherein the audio content played by the speaker is a story; and
the method further comprises: adjusting at least one of the brightness or the color temperature of the light emitted by the light-emitting diode based on the information associated with the story.

10. The voice broadcasting method according to claim 9, wherein the voice command includes commands to start playing, play along a single loop of contents, or play by circulating all contents.

11. The voice broadcasting method according to claim 9, wherein the parameter initialization is performed by:
turning on a broadcasting,
setting a default broadcasting path using the memory; and
setting a default broadcasting mode by circularly broadcasting all of the audio contents.

12. The voice broadcasting method according to claim 9, wherein, after the network command interrupt is enabled, the lighting device receives control instructions from a smart mobile terminal to modify parameters of the lighting device.

13. The voice broadcasting method according to claim 9, wherein the step of enabling the voice command recognition interrupt further comprises:

detecting whether there is an inputted voice, if the inputted voice is detected, triggering the voice command recognition interrupt;

performing the voice recognition on the inputted voice to provide a recognized voice; and determining whether the recognized voice is the voice command, and modifying parameters according to a matched voice command, wherein the processor of the lighting device controls other components according to the modified parameters.

14. The voice broadcasting method according to claim 9, wherein the step of selecting the audio content in the memory comprises, when the audio contents from the Internet are read, a preset website link is visited, and the audio contents are downloaded to the memory while being read.

15. The voice broadcasting method according to claim 9, before the step of selecting the audio content in the memory, further comprising: enabling an alarm interrupt including:

determining whether a current time is the same as a preset alarm time;

when the current time matches the preset alarm time, triggering the alarm interrupt and playing an alarm sound; and when the current time does not match the preset alarm time, stop triggering the alarm interrupt.

16. The voice broadcasting method according to claim 15, wherein: when the alarm interrupt is triggered, the audio contents stored in the memory are played automatically.

17. The lighting device according to claim 1, wherein:

the processor is further configured to gradually dim the emitted light from the light-emitting diode at preset time intervals when the speaker is playing the audio content.

18. The lighting device according to claim 17, wherein:

the processor is further configured to dim the emitted light for a preset brightness level at each of the preset time intervals.

19. The lighting device according to claim 1, wherein:

the processor is further configured to turn off the emitted light after the speaker plays the audio content for a preset time duration.

20. The lighting device according to claim 1, wherein: the information associated with the story includes at least one of an environment mentioned in the story or a type of the story.

21. The voice broadcasting method according to claim 9, wherein:

adjusting at least one of the brightness and the color temperature of the light further comprises: adjusting at least one of the brightness or the color temperature of the light emitted by the light-emitting diode based on at least one of an environment mentioned in the story or a type of the story.

* * * * *